US008886012B2

(12) United States Patent
Morimoto et al.

(10) Patent No.: US 8,886,012 B2
(45) Date of Patent: Nov. 11, 2014

(54) INFORMATION PROCESSING APPARATUS, INFORMATION PROCESSING METHOD, AND PROGRAM

(75) Inventors: Naoki Morimoto, Tokyo (JP); Kenichiro Aridome, Kanagawa (JP); Yukio Isobe, Kanagawa (JP); Atsushi Mae, Kanagawa (JP)

(73) Assignee: Sony Corporation, Tokyo (JP)

( * ) Notice: Subject to any disclaimer, the term of this patent is extended or adjusted under 35 U.S.C. 154(b) by 1359 days.

(21) Appl. No.: 12/416,299

(22) Filed: Apr. 1, 2009

(65) Prior Publication Data

US 2009/0279852 A1 Nov. 12, 2009

(30) Foreign Application Priority Data

May 7, 2008 (JP) ................................ 2008-121408

(51) Int. Cl.

| | |
|---|---|
| H04N 7/00 | (2011.01) |
| G11B 27/10 | (2006.01) |
| G11B 27/28 | (2006.01) |
| G11B 27/00 | (2006.01) |
| G11B 20/10 | (2006.01) |
| H04N 21/2343 | (2011.01) |
| G06F 17/30 | (2006.01) |
| H04N 21/262 | (2011.01) |

(52) U.S. Cl.
CPC ............ *G11B 27/28* (2013.01); *G11B 27/002* (2013.01); *G11B 2020/10537* (2013.01); *H04N 21/23439* (2013.01); *G11B 27/105* (2013.01); *G06F 17/30772* (2013.01); *G11B 2220/2541* (2013.01); *G06F 17/30843* (2013.01); *G06F 17/30793* (2013.01); *H04N 21/26258* (2013.01)
USPC ........... 386/248; 386/241; 386/242; 386/243; 386/278; 386/279; 386/281; 386/282; 386/290

(58) Field of Classification Search
CPC .................. G11B 2020/10537; G11B 27/002; H04N 21/26258; H04N 21/23439; G06F 17/30772
USPC ......... 386/241–243, 248, 278, 279, 281, 282, 386/290
See application file for complete search history.

(56) References Cited

U.S. PATENT DOCUMENTS 7,743,014 B1 * 6/2010 Alexander et al. .................... 1/1
2002/0018637 A1 * 2/2002 Saito ................................ 386/40

(Continued)

FOREIGN PATENT DOCUMENTS

| | | |
|---|---|---|
| JP | 2005-117083 | 4/2005 |
| JP | 2005-277733 | 10/2005 |

(Continued)

OTHER PUBLICATIONS

Office Action issued Jan. 4, 2011, in Japan Patent Application No. 2008-121408.

*Primary Examiner* — Michael Simitoski
*Assistant Examiner* — Gary Lavelle
(74) *Attorney, Agent, or Firm* — Oblon, Spivak, McClelland, Maier & Neustadt, L.L.P.

(57) ABSTRACT

An information processing apparatus includes: a detecting section that detects feature information of at least one AV stream; a recording section that records the AV streams, clip information defining attributes including the detected feature information, and playback-segment data specifying at least one playback segment to a storage medium in accordance with a predetermined data-recording format, the playback-segment data being obtained by setting a playback start point and a playback end point with respect to the AV streams; a playback-segment setting section that sets the playback segments with respect to the AV streams on the basis of detection time point of the feature information; and a data generating section that generates the playback-segment data specifying the playback segments set by the playback-segment setting section.

21 Claims, 14 Drawing Sheets

(56) References Cited

U.S. PATENT DOCUMENTS

| | | | |
|---|---|---|---|
| 2003/0002668 A1* | 1/2003 | Graunke et al. | 380/45 |
| 2003/0007515 A1* | 1/2003 | Apostolopoulos et al. | 370/503 |
| 2004/0052505 A1* | 3/2004 | Ahmad et al. | 386/69 |
| 2005/0232588 A1* | 10/2005 | Hosoda et al. | 386/69 |
| 2005/0232606 A1* | 10/2005 | Hosoda et al. | 386/111 |
| 2007/0067723 A1* | 3/2007 | Hosoda et al. | 715/723 |
| 2007/0223876 A1* | 9/2007 | Hashimoto et al. | 386/95 |
| 2008/0240503 A1* | 10/2008 | Okada et al. | 382/103 |
| 2009/0103898 A1* | 4/2009 | Morioka et al. | 386/117 |

FOREIGN PATENT DOCUMENTS

| | | |
|---|---|---|
| JP | 2008-33983 | 2/2008 |
| WO | WO 2007/108458 A1 | 9/2007 |

\* cited by examiner

INFORMATION PROCESSING APPARATUS, INFORMATION PROCESSING METHOD, AND PROGRAM

BACKGROUND OF THE INVENTION

1. Field of the Invention

The present invention relates to information processing apparatuses, information processing methods, and programs. In particular, the present invention relates to an information processing apparatus, an information processing method, and a program which edit an AV (audio/video) stream recorded in accordance with a predetermined data-recording format.

2. Description of the Related Art

With increasing recording capacities of disk-shaped storage media, video cameras of a type that stores moving images and still images on discs instead of traditional recording tapes have emerged. Since disk-shaped storage media have random access capabilities, desired scenes can be efficiently found. Also, since data access is contactless, it is possible to use information storage media without deterioration thereof. For example, the number of users of DVD video cameras is increasing year by year because of their high image qualities and ease of use, such as editing capabilities.

When content such as a moving image is to be recorded to an information storage medium, processing for generating information that is different from substantial data of an AV stream and recording the substantial data and the generated information to the information storage medium, in accordance with a predetermined data format, such as an AVCHD (Advanced Video Codec High Definition) format. Examples of the information that is different from the substantial data of the AV stream include attribute information, such as an AV stream size and playback time, and playback-segment information specified for the AV stream. The playback-segment information refers to a set of information of a playback start point and information of a playback end point with respect to the AV stream.

Typically, multiple pieces of playback-segment information can be set with respect to one AV stream. Multiple playback segments set with respect to multiple AV streams can also be specified to generate a playback list (a playlist). For example, when a characteristic portion is selected from moving-image content, recorded on an information storage medium, in accordance with a user input, playback-segment information containing the characteristic portion can be set to generate a playback list. With this arrangement, the user can create a playback list and can check the contents of images, captured by a DVD video camera, in a short period of time (e.g., refer to Japanese Unexamined Patent Application Publication No. 2008-33983).

SUMMARY OF THE INVENTION

However, in order for the user to specify a characteristic portion of the moving image content, he or she typically has to re-check the captured-moving-image content. Thus, there is a problem in that a playback list (a playlist) containing the characteristic portion may not be easily created without a user input.

Accordingly, the present invention has been made in view of the foregoing situation, and it is desirable to provide an information processing apparatus, an information processing method, and a program which are novel and improved and are capable of extracting a characteristic moving image from moving images recorded in accordance with a predetermined data-recording format and are capable of automatically editing the extracted moving image.

In order to overcome the above-described problem, according to one embodiment of the present invention, there is provided an information processing apparatus. The information processing apparatus includes: a detecting section configured to detect feature information of at least one AV (audio/video) stream; a recording section configured to record the AV streams, clip information defining attributes including the detected feature information, and playback-segment data specifying at least one playback segment to a storage medium in accordance with a predetermined data-recording format, the playback-segment data being obtained by setting a playback start point and a playback end point with respect to the AV streams; a playback-segment setting section configured to set the playback segments with respect to the AV streams on the basis of detection time point of the feature information; and a data generating section configured to generate the playback-segment data specifying the playback segments set by the playback-segment setting section.

With this arrangement, feature information of the AV streams is detected, and a playback segment or playback segments are set by setting a playback start point and a playback end point with respect to the AV streams, on the basis of the detection time point of the feature information. Then, a predetermined number of playback segments are extracted from the set playback segments and playback-segment data containing the extracted playback segments is generated.

This arrangement allows the user to automatically create a playlist (as a digest) including images he or she is interested in from content of captured or recorded moving images, by simply pressing an input button, such as a digest creation button, for generating the playback-segment data. That is, the user can promptly check characteristics of the content of captured or recorded moving images without checking all content of the moving images. In addition, creating a playlist according to a predetermined data-recording format allows a playback apparatus that complies with the standard of the data-recording format to check the same result.

The predetermined data-recording format may be an AVCHD (advanced video codec high definition) format.

The information processing apparatus may further include a playback-segment extracting section configured to extract a predetermined number of playback segments from the playback segments set by the playback-segment setting section, in accordance with playback time of each AV stream. The data generating section may generate the playback-segment data specifying the playback segments extracted by the playback-segment extracting section. The playback-segment extracting section may extract a large number of playback segments from the AV stream having a long playback time. With this arrangement, it is possible to extract an optimum number of playback segments from the set playback segments.

The playback-segment setting section may set the detection time point of the feature information to the playback start time of each playback segment and may set a point at which a predetermined time passes from the detection time point of the feature information to the playback end point of the playback segment. The playback-segment setting section does not necessary have to set the playback segments when an amount of time from the detection time point of the feature information to a playback-end time point of the AV stream is smaller than a predetermined time.

The feature information detected by the detecting section may be face information contained in the AV streams. The feature information detected by the detecting section may be time information for the AV streams. The detecting section may detect resolutions of the AV streams and the playback-segment data generating section may generate the playback-segment data by specifying the playback segments having the same resolution.

The data generating section may generate the playback-segment data by specifying the playback segments set for the AV streams having the resolution set for many of the playback segments. When the playback segments overlap each other, the data generating section may delete one of the overlapping playback segments or may combine the playback segments.

The information processing apparatus may further include a discontinuity-flag setting section configured to set a discontinuity flag for a one first of the playback segments when the first playback segment and a second one of the playback segments are discontinues, the playback start point of the second playback segment being subsequent to the playback end point of the first playback segment. The information processing apparatus may further include an automatic-edit-flag setting section configured to set an automatic edit flag for the playback-segment data generated by the data generating section.

The information processing apparatus may further include a selecting section configured to select a predetermined one of the AV streams in accordance with a user input, and the playback-segment setting section may set the playback segment with respect to the AV stream selected by the selecting section.

The playback-segment setting section may set a playback start point and a playback end point for the playback-segment data generated by the data generating section.

The data generating section may generate the playback-segment data by changing the playback segments to be specified, each time the playback-segment data is generated.

In order to overcome the above-described problem, another embodiment of the present invention provides an information processing method. The information processing method includes the steps of: detecting feature information of at least one AV stream; setting a least one playback segment by setting a playback start point and a playback end point with respect to the AV streams on the basis of detection time point of the feature information; generating playback-segment data specifying the playback segments; and recording the AV streams, clip information defining attributes including the detected feature information, and the playback-segment data to a storage medium in accordance with a predetermined data-recording format.

In order to overcome the above-described problem, another embodiment of the present invention provides a program for causing a computer to function as an information processing apparatus. The information processing apparatus includes: a detecting section configured to detect feature information of at least one AV stream; a recording section configured to record the AV streams, clip information defining attributes including the detected feature information, and playback-segment data specifying at least one playback segment to a storage medium in accordance with a predetermined data-recording format, the playback-segment data being obtained by setting a playback start point and a playback end point with respect to the AV streams; a playback-segment setting section configured to set the playback segments with respect to the AV streams on the basis of detection time point of the feature information; and a data generating section configured to generate the playback-segment data specifying the playback segments set by the playback-segment setting section.

As described above, according to the present invention, it is possible to extract a characteristic moving image from moving images recorded in accordance with a predetermined data-recording format and to automatically edit the moving image.

DESCRIPTION OF THE PREFERRED EMBODIMENTS

Figure 1:
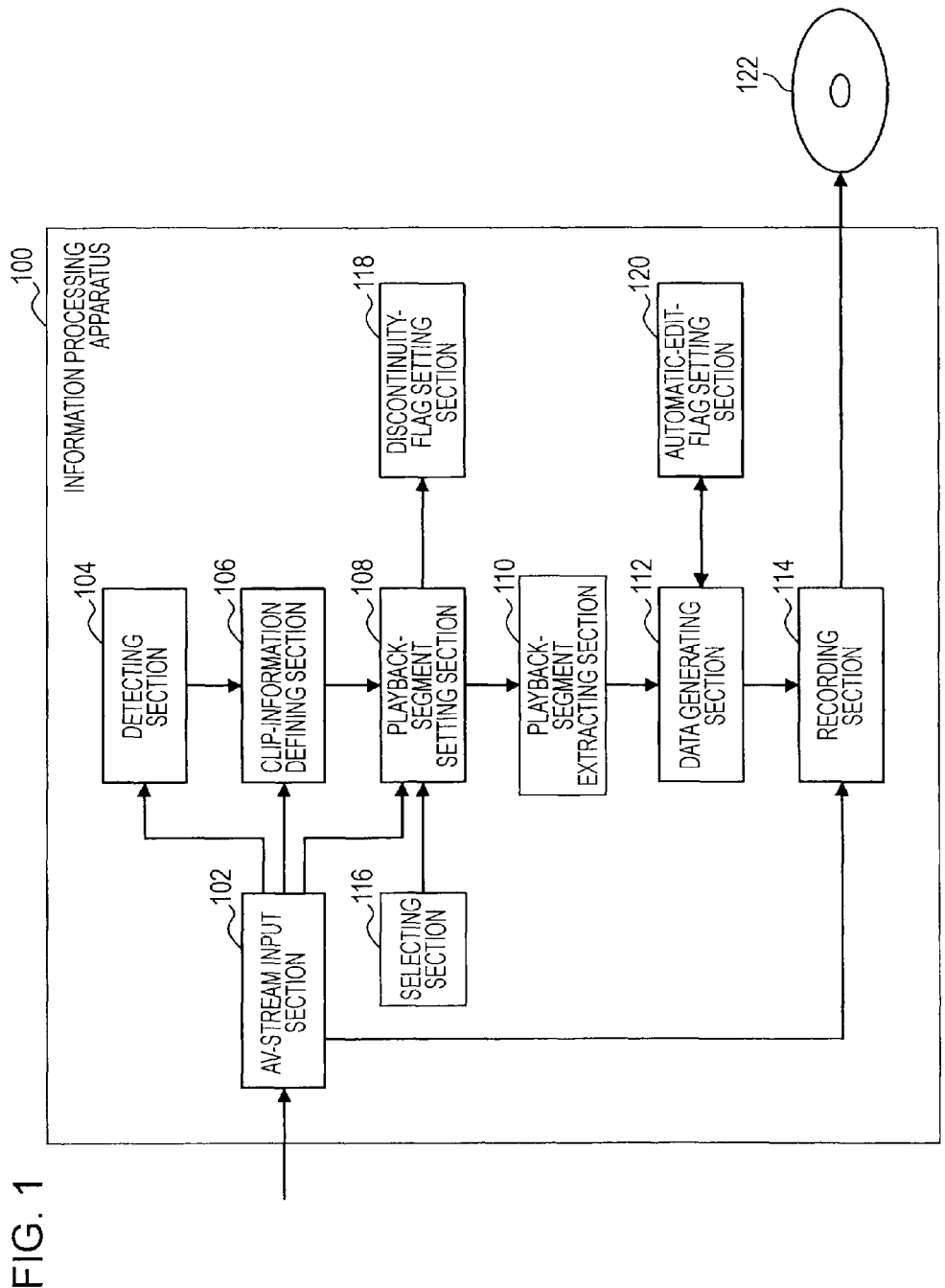
FIG. 1 is a block diagram showing the functional configuration of an information processing apparatus according to one embodiment of the present invention.

Preferred embodiments of the present invention will be described below in detail with reference to the accompanying drawings. Elements having substantially the same functional configurations are denoted by the same reference numbers and redundant descriptions thereof are not given herein and in the drawings.

The configuration and the operation of an information processing apparatus 100 according to an embodiment of the present invention will be described below in detail with reference to the accompanying drawings.

In the present embodiment, the information processing apparatus 100 may be, for example, a video apparatus such as editing apparatus or a playback apparatus. Although the information processing apparatus 100 is described as an apparatus that is independent from an image-capture apparatus, a video recording apparatus, and an information storage medium, the present invention is not limited to the example. For example, the information processing apparatus 100 may be integrally configured with an image-capture apparatus or may be integrally configured with a video recording apparatus. In the present embodiment, video and so on obtained from image capturing performed by an image-capture apparatus that is independent from the information processing apparatus 100 are externally input thereto.

The configuration of the information processing apparatus 100 according to the embodiment of the present invention will now be described with reference to FIG. 1. FIG. 1 is a block diagram showing the functional configuration of the information processing apparatus 100 according to the present embodiment. As shown in FIG. 1, the information processing apparatus 100 includes an AV(audio/video)-stream input section 102, a detecting section 104, a clip-information defining section 106, a playback-segment setting section 108, a playback-segment extracting section 110, a data generating section 112, a recording section 114, a selecting section 116, a discontinuity-flag setting section 118, and an automatic-edit-flag setting section 120.

As described above, video and so on obtained through image capturing or recording performed by an apparatus that is independent from the information processing apparatus 100 are input thereto. An input AV stream is recorded to an information storage medium 122 in accordance with a predetermined data-recording format. Examples of the recording format for storing AV data include an AVCHD (Advanced Video Codec High Definition) format, a BDAV (Blu-ray Disc Audio/Visual) format, and a BDMV (Blu-ray Disc MoVie) format. An example of the AVCHD format is described below as a recording format for storing AV data.

Before a detailed description of the functional configuration of the information processing apparatus 100 is given, the AVCHD format is described with reference to FIGS. 2 to 4. The AVCHD format is a recording format in which an AV stream in which video data and audio data are multiplexed is recorded to a storage medium. A moving-image stream obtained by a video camera or the like is encoded into an MPEG2 TS (transport stream) and, during recording in accordance with the AVCHD format, the encoded stream is recorded to the storage medium as a file. The file is referred to as a "clip AV stream file (or an AV stream file)".

The clip AV stream file is a management unit on a file system and is not necessarily an easy-to-understand management unit for users. When usability is considered, it is typically required that a system for playing back, as a group, video content divided into multiple clip AV stream files and also information and so on for playing back only one or some of the clip AV stream files be recorded as a database on the storage medium. The AVCHD format enables moving-image content, content attribution information, and so on to be recorded in a database.

A data structure defined for the AVCHD format will be described next. The data structure defined for the AVCHD format has four layers. The lowest layer is referred to as a clip layer in which the clip AV stream is located. A layer above the clip layer is referred to as a playlist layer in which a playlist and play items are located. The playlist is used to specify a playback portion with respect to a clip AV stream. In addition, a layer above the playlist layer is referred to as an object layer in which movie objects, such as commands for specifying a playback sequence and so on with respect to the playlist, are located. The uppermost layer is referred to as an index layer in which an index table that manages titles and so on stored on the storage medium is located.

The clip layer will now be described. A clip AV stream is a bit stream in which video data and audio data are multiplexed according to the MPEG2 TS format or the like, as described above. Information regarding the clip AV stream is recorded to a file as clip information. The clip AV stream file and the clip information file in which the clip information for the clip AV stream file is recorded are also collectively referred to as a clip, being regarded as one object. That is, a clip is one object constituted by the clip AV stream and the clip information.

The playlist layer will now be described. A playlist includes designated AV stream files to be played back and sets of playback start points (IN points) and playback end points (OUT points) of the designated AV stream files. One set of the information of the playback start point and the information of the playback end point is referred to as a play item. Of a playlist, a corresponding segment in a clip is played back based on the information of the IN point and the information of the OUT point of a play item.

The object layer will now be described. A movie object contains terminal information that provides coordination between a navigation command program and a movie object. The navigation program serves as a command (a navigation command) for controlling playback of the playlist.

The index layer will now be described. The index layer includes an index table. The index table is a highest level table that defines titles of content recorded on the storage medium. On the basis of title information stored in the index table, a module manager in system software that resides on a player controls playback of the storage medium.

Figure 2:
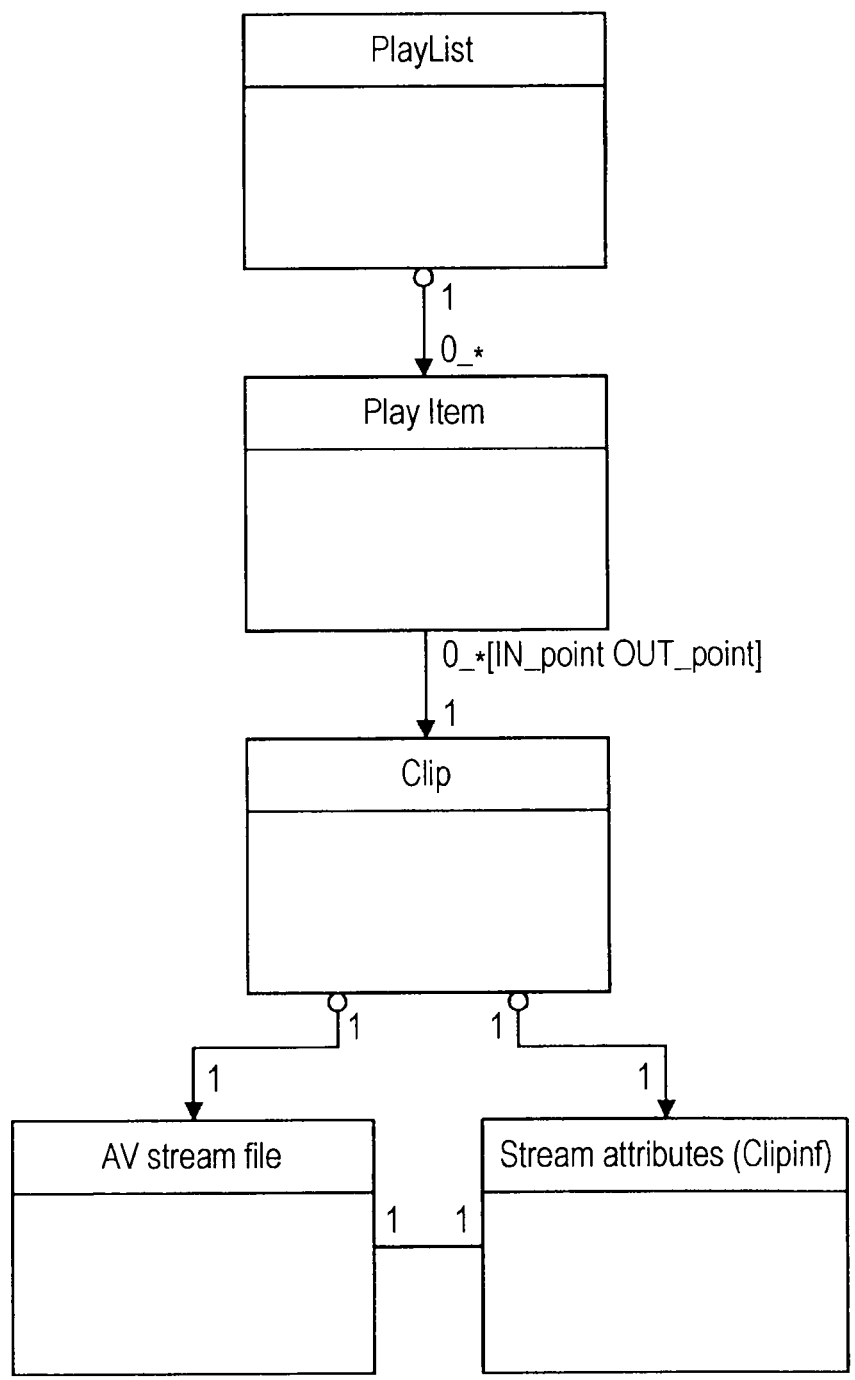
FIG. 2 is a diagram illustrating an AVCHD format according to the present embodiment.

FIG. 2 is a UML (unified modeling language) diagram showing relationships of an AV stream, the clip information (stream attributes), a clip, a play item, and a playlist. A playlist is associated with one or more play items and a play item is associated with one clip. Multiple play items whose starting points and/or end points are different from each other can also be associated with one clip. One clip refers to one clip AV stream file. Similarly, one clip refers to one clip information file. A clip AV stream file and a clip information file have a one-to-one correlation. Definition of such a structure makes it possible to specify a sequence of nondestructive playback in which only an arbitrary portion is played back without modifying an AV stream file.

Figure 3:
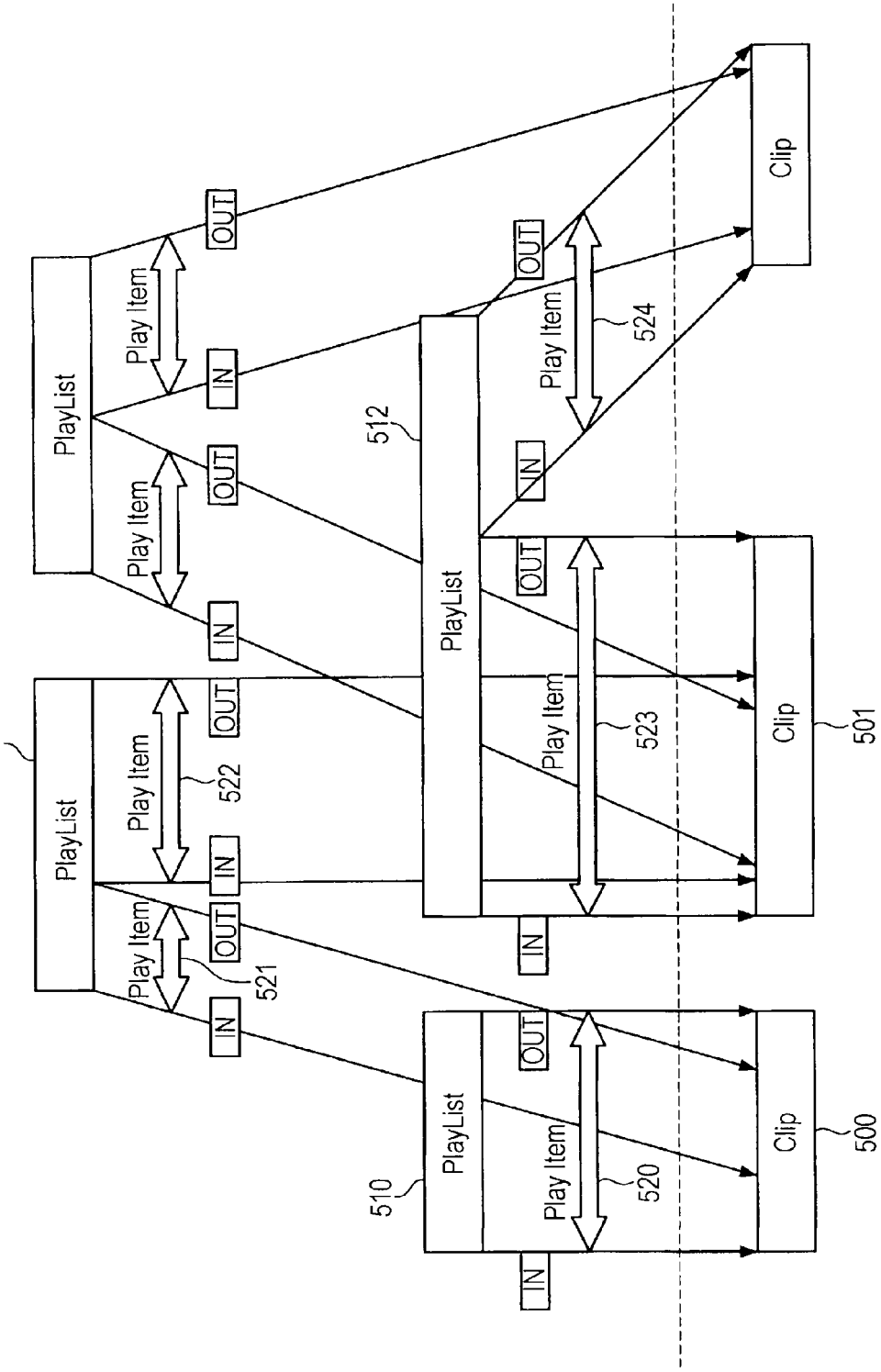
FIG. 3 is a diagram illustrating the AVCHD format according to the present embodiment.
Figure 4:
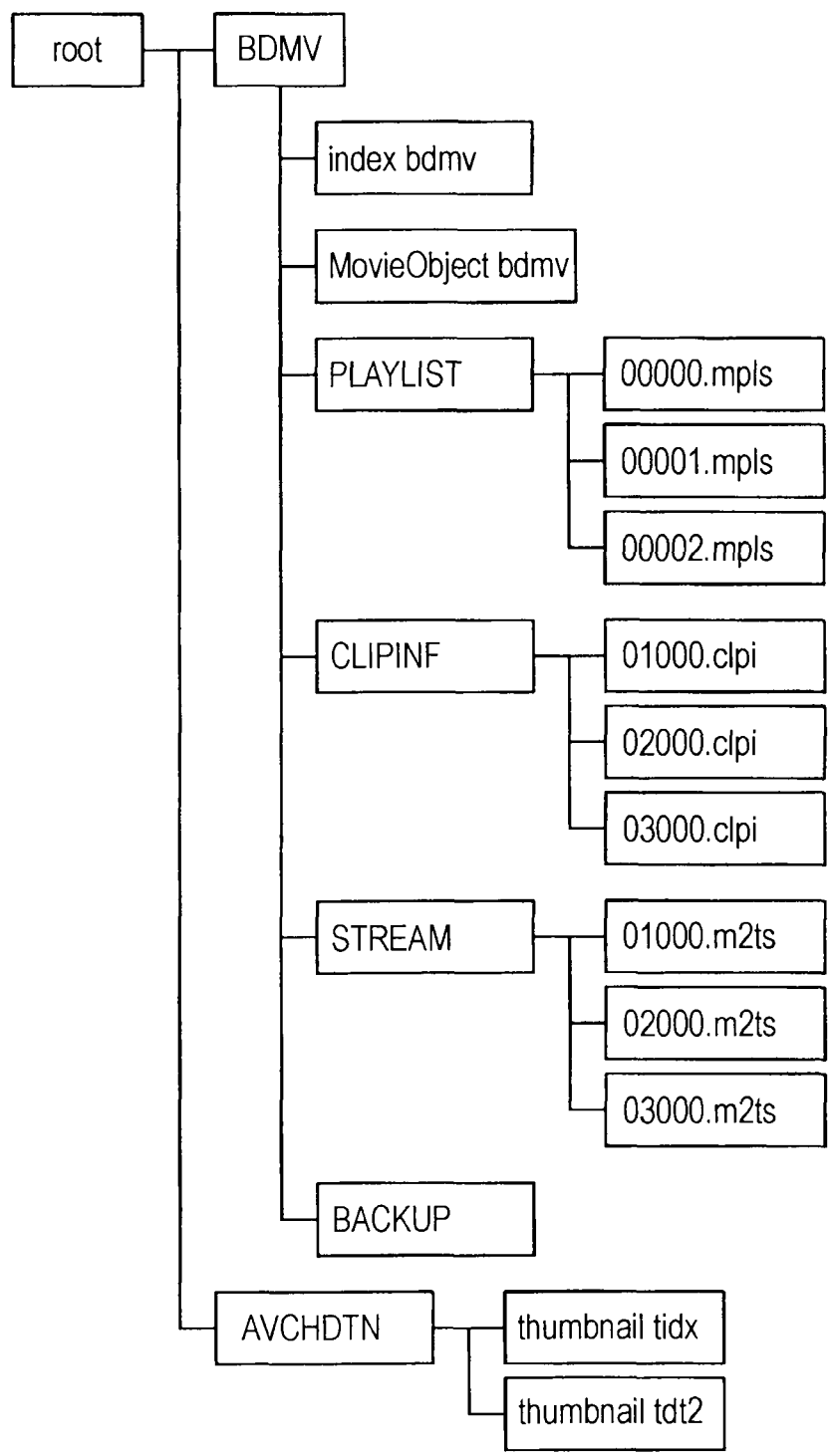
FIG. 4 is a diagram illustrating the AVCHD format according to the present embodiment.

As shown in FIG. 3, multiple playlists can also refer to an identical clip. One playlist can also specify multiple clips. A clip is referred to by an IN point and an OUT point specified by a play item in a playlist. In FIG. 3, a clip 500 is referred to by a play item 520 in a play list 510, and a segment specified by an IN point and an OUT point is referred to by a play item 521 of the play items 521 and 522 included in a play list 511. In a clip 501, a segment specified by the IN point and the OUT point of a play item 523 of play items 523 and 524 in a playlist 512 is referred to. In FIG. 3, the clip 501 is also referred to by another play list.

When the user captures or records images or the like with an image-capture apparatus or the like, he or she repeats the start and stop of recording processing to thereby generate clips, playlists, and so on. For example, for each segment from when the user starts recording until he/she stops the recording, one clip AV stream file is generated, or one clip AV stream file is generated at a delimiter of a stream of recorded or captured images. In conjunction with generation of a clip AV stream file, a clip information file is also created. As described above, one clip serves as a unit that involves continuous synchronization playback, i.e., guaranteed actual time playback.

Each time the user starts recording, an entry mark is attached to the beginning of the play item. Although there is a restriction in that an entry mark is attached to the beginning of a playlist for a moving image, the position of the entry mark can be moved on a time axis through a predetermined edit operation.

Each entry mark acts as a chapter start point at which the user can access the stream. Thus, a segment separated by two adjacent entry marks serves as a chapter, that is, a minimum edit unit that is seen from the user. Arrangement of play items in order of playback defines a playback sequence in a playlist. In the present embodiment, one AV stream generated by a user starting recording and stopping the recording is also referred to as a "chapter".

Next, the management structure of a file recorded on a storage medium according to the AVCHD format will be described with reference to FIG. 4. A file recorded on the storage medium according to the AVCHD format is managed hierarchically in a directory structure. First, one directory (a "root" direction shown in FIG. 4) is first created on the storage medium. An area below the root directory is managed by one recording/playback system.

Directories particularly associated with the present embodiment, of the directory structure shown in FIG. 4, will now be described. A directory "PLAYLIST" is a directory in which the database of playlists is placed. That is, the directory "PLAYLIST" contains files "xxxxx.mpls", which are files regarding playlists. The files "xxxxx.mpls" are created for the respective playlists.

A directory "CLIPINF" is a directory in which the database of clips is placed. That is, the directory "CLIPINF" contains files "zzzzz.clpi", which are clip information files for respective clip AV stream files. A directory "STREAM" is a directory in which substantial AV stream files are placed. That is, the directory "STREAM" contains clip AV stream files corresponding to the respective clip information files. The clip AV stream files contain MPEG2 TSs with file names "zzzzz.m2ts". Giving the same file name as the corresponding clip information file to a portion other than the extension of the file name makes it possible to easily recognize the correlation between the clip information file and the clip AV stream file. The above-description has been given of the AVCHD format.

The information processing apparatus 100 according to the present embodiment sets a playback segment (hereinafter, also referred to as a "play item") specified by an IN point and an OUT point with respect to an AV stream, and generates playback-segment data (hereinafter, also referred to as a "playlist") by specifying multiple playback segments. The AV streams, the clip information, the playback-segment data, and so on are recorded to the information storage medium in accordance with the AVCHD format. The functional configuration of the information processing apparatus 100 will now be described with reference back to FIG. 1.

The AV-stream input section 102 has a function for receiving an input of a moving-image stream (an AV stream) obtained by an image-capture apparatus or the like. The AV-stream input section 102 may encode the input moving-image stream into an MPEG2 TS or may receive an input of an encoded MPEG2 TS. As described above, the AV stream is input to the AV-stream input section 102 for each chapter, i.e., for each segment from when the user starts recording until he/she ends the recording. The AV-stream input section 102 supplies the AV stream to the detecting section 104, the clip-information defining section 106, the playback-segment setting section 108, and the recording section 114, and so on.

The detecting section 104 has a function for detecting feature information of the AV stream supplied from the AV-stream input section 102. Examples of the feature information of the AV stream include face information contained in the AV stream and time information of the AV stream. When the AV stream is obtained by an image-capture apparatus or the like, the feature information can include, for example, recording start information, information of still-image simultaneous recording operation during moving-image capture, zoom operation information, panning operation information, exposure correction information, motion vector information of an input image, color information, focus information, sound-volume information, and position information using a GPS (global positioning system). The feature information may also be information obtained when the information changes or exceeds a predetermined threshold.

The clip-information defining section 106 receives the AV stream supplied from the AV-stream input section 102 as a clip AV stream, and the clip-information defining section 106 has a function for defining clip information corresponding to the clip AV stream. The clip information is used to play back the AV stream and is AV-stream attribute information, such as an AV stream size and playback time. The clip-information defining section 106 defines the feature information, supplied from the detecting section 104, as clip information together with other AV-stream attribute information. The clip-information defining section 106 supplies the defined clip information to the playback-segment setting section 108.

The playback-segment setting section 108 has a function for setting a playback segment with respect to an AV stream on the basis of the detection time point of the feature information detected by the detecting section 104. The playback-segment setting section 108 sets a playback segment by setting a playback start point (hereinafter, also referred to as an "IN point") and a playback end point (hereinafter, also referred to as an "OUT point") with respect to an AV stream. For example, the arrangement may also be such that the detection time point of the feature information is set as the playback start point of the playback segment and a point after a predetermined time has passed from the detection time point of the feature information is set as the playback end point of the playback segment. The arrangement may also be such that the detection time point of the feature information is set as the playback end point of the playback segment and a point before the detection time point of the feature information is set as the playback start point of the playback segment.

That is, the IN point corresponds to a point obtained by offsetting the time of the detection point by a positive or negative amount of time. The offset value may be a fixed value or a random value. The IN point may be time at which a certain period of time or a random period of time has passed from the time of the detection point. The OUT point is also a point obtained by offsetting the time of the detection time point by a positive or negative amount of time, and the offset value may be a fixed value or a random value. The OUT point may be time at which a certain period of time or a random period of time has passed from the IN point. The arrangement may also be such that, when the time from the detection time point of the feature information to the playback end point of the AV stream is smaller than a predetermined time, the playback-segment setting section 108 does not set any playback segment.

The playback-segment extracting section 110 has a function for extracting a predetermined number of playback segments from multiple playback segments set by the playback-segment setting section 108. The number of playback segments extracted by the playback-segment extracting section 110 may be fixed, or may be varied according to the playback time of an AV stream. For example, when multiple playback segments are set with respect to multiple AV streams, the number of playback segments to be extracted may be varied according to the entire playback time of the AV streams. The number of playback segments to be extracted from each AV stream may also be varied according to the length of each AV stream.

The data generating section 112 has a function for generating playback-segment data that specifies playback segments. The data generating section 112 may generate the playback-segment data by specifying playback segments extracted by the playback-segment extracting section 110 or by specifying playback segments unspecified by the playback-segment extracting section 110. The data generating section 112 may generate the playback-segment data by always specifying a playback segment having the same content or by specifying a playback segment that differs each time the playback-segment data is generated.

According to the AVCHD format, a playback segment set by the playback-segment setting section 108 is a play item and the playback-segment data generated by the data generating section 112 is a playlist. That is, the playback-segment data that specifies multiple playback segments is generated to thereby make it possible to perform nondestructive playback edit in which only an arbitrary portion is played back without directly modifying an AV stream.

The data generating section 112 may set an entry mark that separates playback segments. As described above, the entry mark separates the playback-segment data for each chapter. For example, when the generated playback-segment has a playback time of several seconds, an entry mark may be added to only the beginning of the playback-segment data to define the playback segment as one chapter. When the generated playback-segment data has a playback time of a few tens of minutes or a few hours, an entry mark may be added to each playback segment to define the playback segment as one chapter. The data generating section 112 supplies the generated playback-segment data to the recording section 114.

The detecting section 104 detects the resolutions of AV streams. When resolutions are set for playback segments, playback segments having the same resolution may be specified to generate the playback-segment data. In addition, playback segments set for AV streams having resolutions set for many of the playback segments may be specified to generate the playback-segment data. When the set playback segments overlap each other, one of the overlapping playback segments may be selected to generate the playback-segment data.

Figure 5:
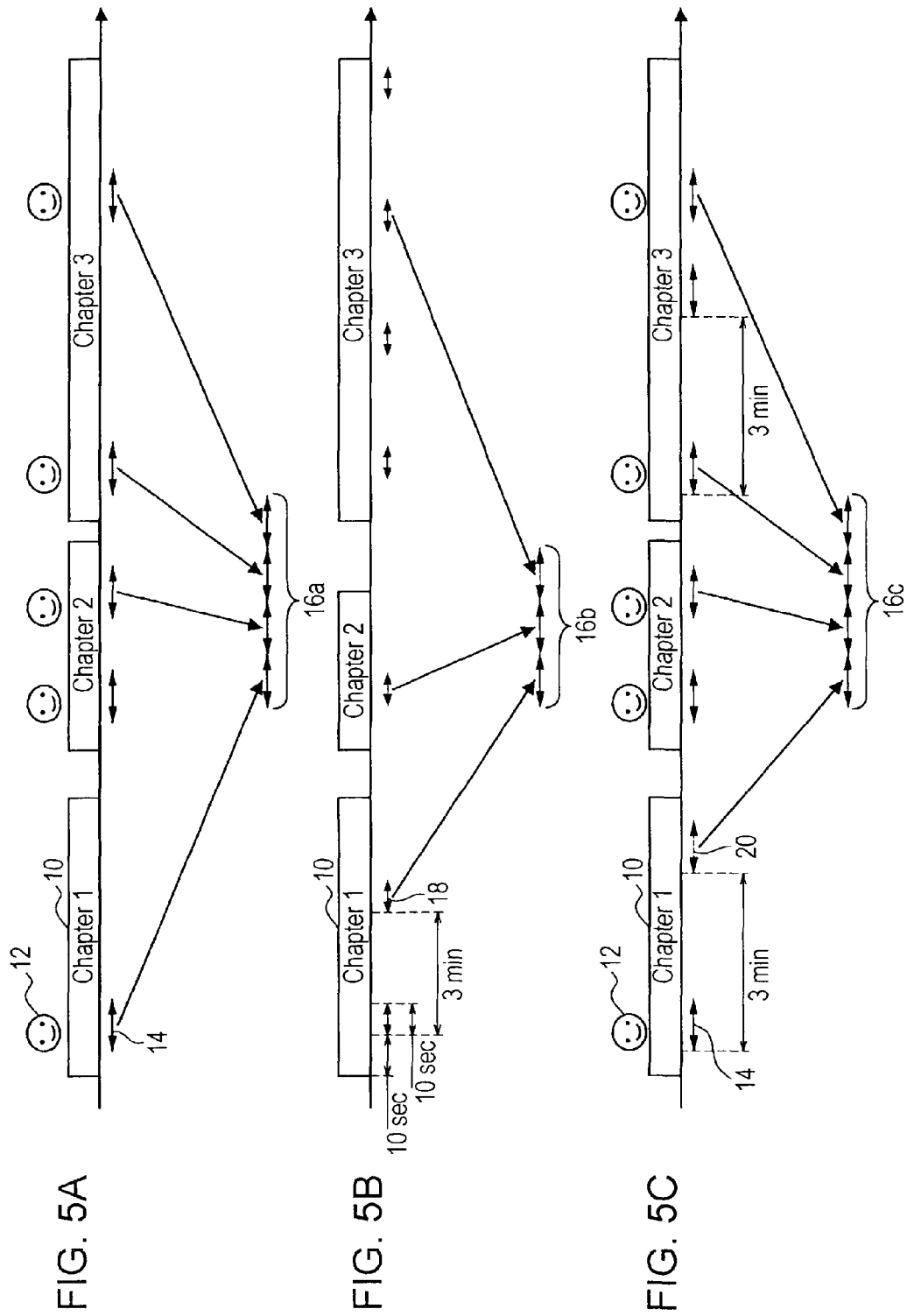
FIGS. 5A to 5C are diagrams each illustrating setting and extraction of playback segments and generation of playback-segment data.

Setting and extraction of playback segments and generation of the playback-segment data will now be described with reference to FIGS. 5A to 5C. FIGS. 5A to 5C are diagrams illustrating setting and extraction of playback segments and generation of the playback-segment data. FIG. 5A shows a case in which face information is detected as feature information, and FIGS. 5B and 5C show cases in which time information and face information are detected as feature information.

In the example of FIG. 5A, the IN point is 2 seconds before face information is detected and the OUT point is 10 seconds after the IN point. As shown in FIG. 5A, face information contained in chapters 1, 2, and 3 is detected. For example, when a face 12 of chapter 1 is detected, the IN point is set to 2 seconds before the face 12 is detected and the OUT point is set to 10 seconds after the IN point, so that a playback segment 14 is set. Similarly, face information contained in chapters 2 and 3 is detected, so that corresponding playback segments are set.

A predetermined number of playback segments are extracted from the set playback segments, so that playback-segment data 16a is generated. The number of playback segments to be extracted may be determined in accordance with the total playback time of three chapters. Playback segments may also be extracted in accordance with the playback time of the individual chapters in such a manner that two playback segments are extracted from chapter 3 having a long playback time and one playback segment is extracted from each of the other chapters.

In the examples of FIGS. 5B and 5C, the IN point is 2 seconds before the time of face information detection, 10 seconds after chapter-start time, or 3 minutes after the previously set IN-point time. The OUT point is 10 seconds after the IN point, in the same manner as that in FIG. 5A. For example, when face information is not contained in an obtained AV stream, a playback segment 18 is set based on only time information, as in the example of FIG. 5B. As in the example of FIG. 5C, when face information is contained in an AV stream, a playback segment 14 is set based on the detection time of a face 12 and a playback segment 20 is set based on the time information. Extraction of the playback segments in the examples of FIGS. 5B and 5C and generation of playback-segment data 16b and 16c are analogous those in FIG. 5A.

Setting and extraction of playback segments and generation of the playback-segment data have been described above. Referring back to FIG. 1, in accordance with the AVCHD format, the recording section 114 has a function for recording, to the information storage medium, AV streams supplied from the AV-stream input section 102, the clip information for the AV streams, and the playback-segment data supplied from the data generating section 112.

Examples of the information storage medium may be, for example, a nonvolatile memory (such as an EEPROM [electrically erasable programmable read only memory] or an EPROM [erasable programmable read only memory]), a magnetic disk (such as a hard disk or disk-shaped magnetic disk), an optical disc (such as a CD-RW [compact disc rewritable], a DVD [digital versatile disc]-RW, +RW, RAM [random access memory], or a BD [Blu-ray Disc®]-RE), an MO (magneto optical) disk, a flash memory, or a memory card using a flash memory.

The selecting section 116 has a function for selecting a predetermined AV stream from multiple AV streams in accordance with a user input. The playback-segment setting section 108 may set a playback segment or playback segments with respect to the AV stream selected by the selecting section 116. The selecting section 116 may select a user-desired range from the predetermined AV stream. In addition, the selecting section 116 may select AV streams for each recording date-and-time or may select all AV streams.

The discontinuity-flag setting section 118 has a function for setting, when multiple playback segments set by the playback-segment setting section 108 are discontinuous, a discontinuity flag for the playback segment. For example, when the playback segment 14 and the playback segment 20 shown in FIG. 5C are discontinuous, the discontinuity-flag setting section 118 sets a discontinuity flag for the playback segment 14. The discontinuity flag set by the discontinuity-flag setting section 118 is set in the playlist together with playback-segment information and is recorded to the information storage medium. The discontinuity-flag setting section 118 may attach, to the playback segments, an entry mark that separates the chapters.

The automatic-edit-flag setting section 120 has a function for setting an automatic edit flag for the playback-segment data generated by the data generating section 112. In the AVCHD format, a field to which apparatus-unique data is recordable is prepared. Information indicating whether or not a playlist of interest is an automatically created playlist may be pre-recorded in the apparatus-unique data field. Such an arrangement allows a corresponding apparatus to identify whether or not a playlist of interest is an automatically created playlist to perform playback.

The playback-segment data generated by the data generating section 112 is recorded to the information storage medium as an automatically created playlist. Whether or not a playlist of interest is an automatically created playlist is identified by setting the automatic edit flag in the field in which apparatus-unique data, such as private data of a playlist file, is recordable. In this case, when a playlist of interest is an automatically created playlist, the automatic edit flag indicates "1", and otherwise, the automatic edit flag indicates "0". With this arrangement, during playlist playback of the playback apparatus, a determination is made as to whether or not a playlist of interest is an automatically created playlist on the basis of the information of the automatic edit flag, to thereby allow selective playback of the automatically created playlist.

In the present embodiment, whether or not a playlist of interest is an automatically created playlist is determined based on the set automatic edit flag, but the determination is not limited to this example. For example, whether or not a playlist of interest is an automatically created playlist may be determined by setting a user identifiable name in a playlist-name-setting field in a playlist file. The above-description has been given of the functional configuration of the information processing apparatus 100. Next, a description will be given of a playlist creation method, which is one example of an information processing method for the information processing apparatus 100.

In the playlist creation method described below, the playback-segment setting section 108 sets the playback start time (the IN point) by offsetting the time at which face information is detected and randomly selecting time. The playback end point (the OUT point) is set a certain period of time after the IN point. Playback-segment setting is performed through selection of all input AV streams. An entry mark is set for each playback segment to define the playback segment as one chapter. Each time a playlist is automatically created upon the user pressing an automatic creation button, a different playback segment is specified and different playback-segment data is generated. The total playback time of the playback-segment data is set through user selection or according to a fixed time.

Figure 6:
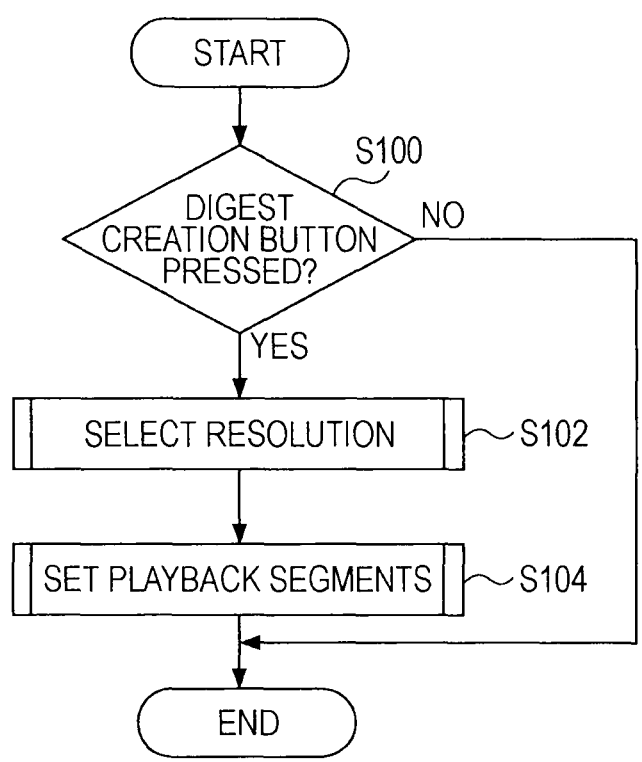
FIG. 6 is a flowchart showing playback-segment setting processing according to the present embodiment.

The playlist creation method for the information processing apparatus 100 will now be described with reference to FIGS. 6 to 14. FIGS. 6 to 14 are flowcharts showing the playlist creation method for the information processing apparatus 100. FIG. 6 is a flowchart showing playback-segment setting processing for the information processing apparatus 100. As shown in FIG. 6, in step S100, a determination is made as to whether or not a user presses a digest creation button via a user input section (not shown). When it is determined in step S100 that the digest creation button is pressed, resolution selection processing is executed in step S102. In the resolution selection processing in step S102, which resolution is to be used is determined to create playback-segment data (a playlist) as a digest. The resolution selection processing will now be described in detail with reference to FIG. 7.

Figure 7:
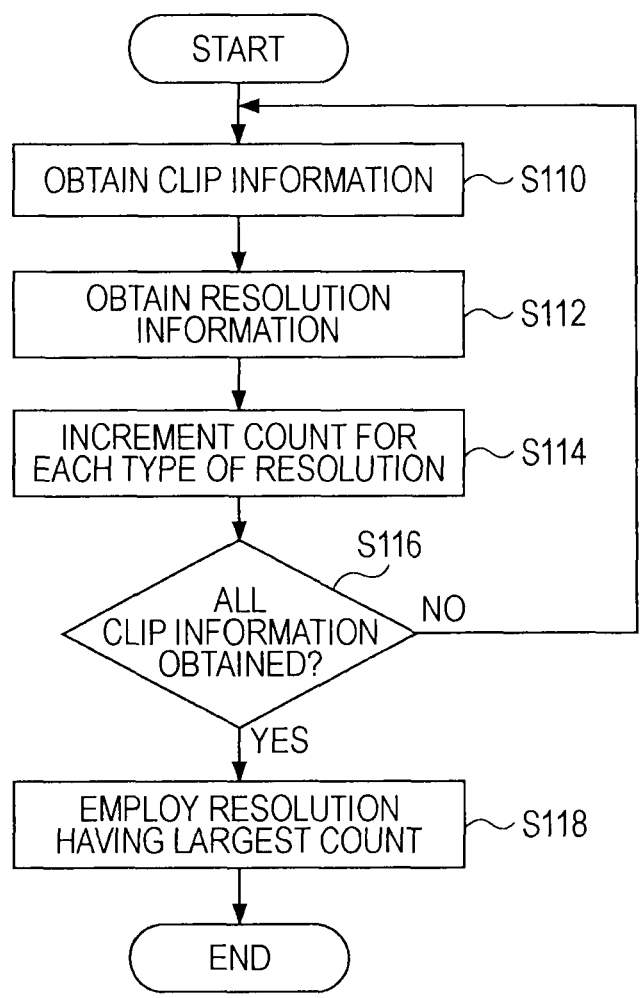
FIG. 7 is a flowchart showing details of resolution-selection processing according to the present embodiment.

As shown in FIG. 7, in step S110, clip information defined by the clip-information defining section 106 is obtained. In step S112, resolution information contained in the clip information obtained in step S110 is obtained. In step S114, a count for each type of resolution is incremented with respect to the resolution obtained in step S112. In step S116, a determination is made as to whether or not all clip information is obtained. When it is determined in step S116 that all clip information is not obtained, the processing in steps S110 to S114 is repeated.

When it is determined in step S116 that all clip information is obtained, the process proceeds to step S118, in which the resolution having the largest one of the resolution-type counts incremented in step S114 is employed. Although the resolution of the largest count is employed in step S118, the present invention is not limited to this example. For example, a playback segment having a larger segment length or having a larger number of appearing faces may be employed. According to the AVCHD format, playback segments (play items) contained in the playback-segment data (playlist) have the same resolution. Since the resolution of the largest one of the counts is employed in step S118, a larger number of playback segments can be specified and the probability of appearance of feature information increases. Thus, it is possible to generate a playlist that contains a larger number of characteristic moving images.

Figure 8:
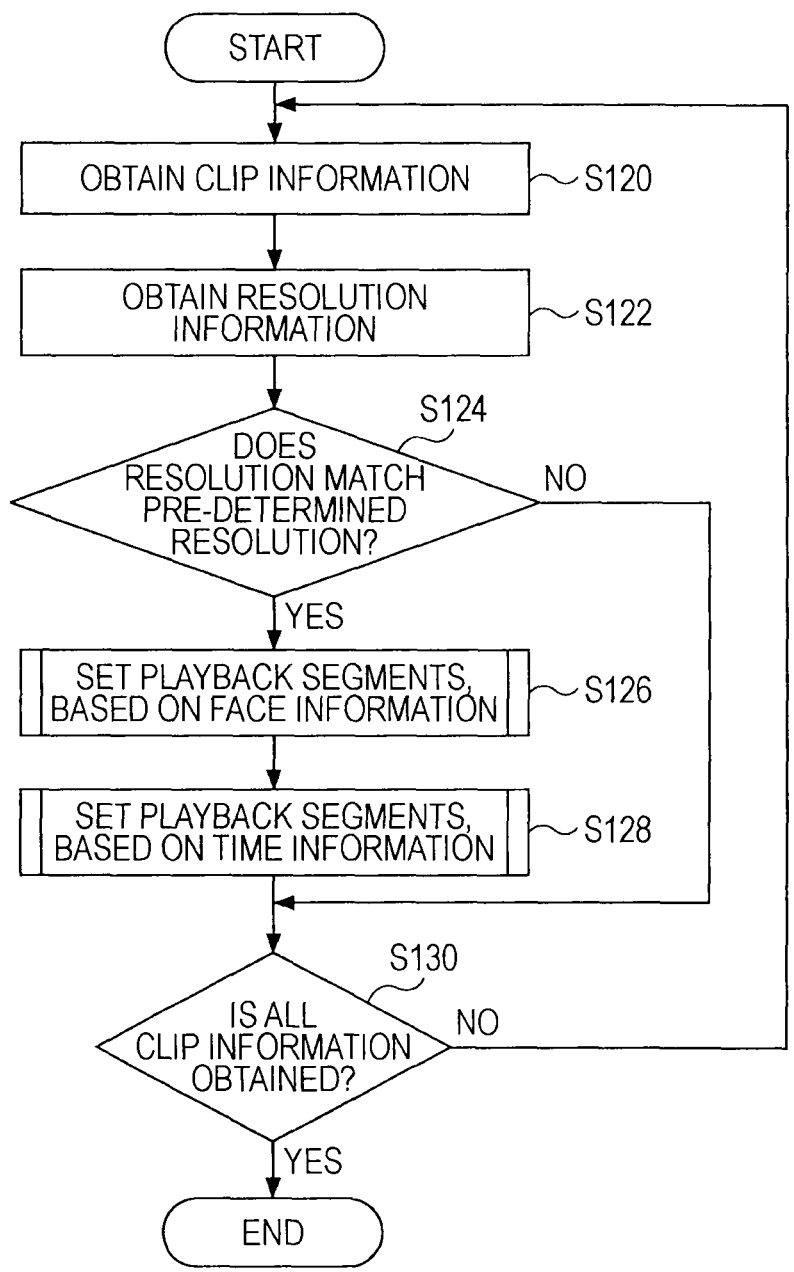
FIG. 8 is a flowchart showing details of playback-segment setting processing according to the present embodiment.
Figure 9:
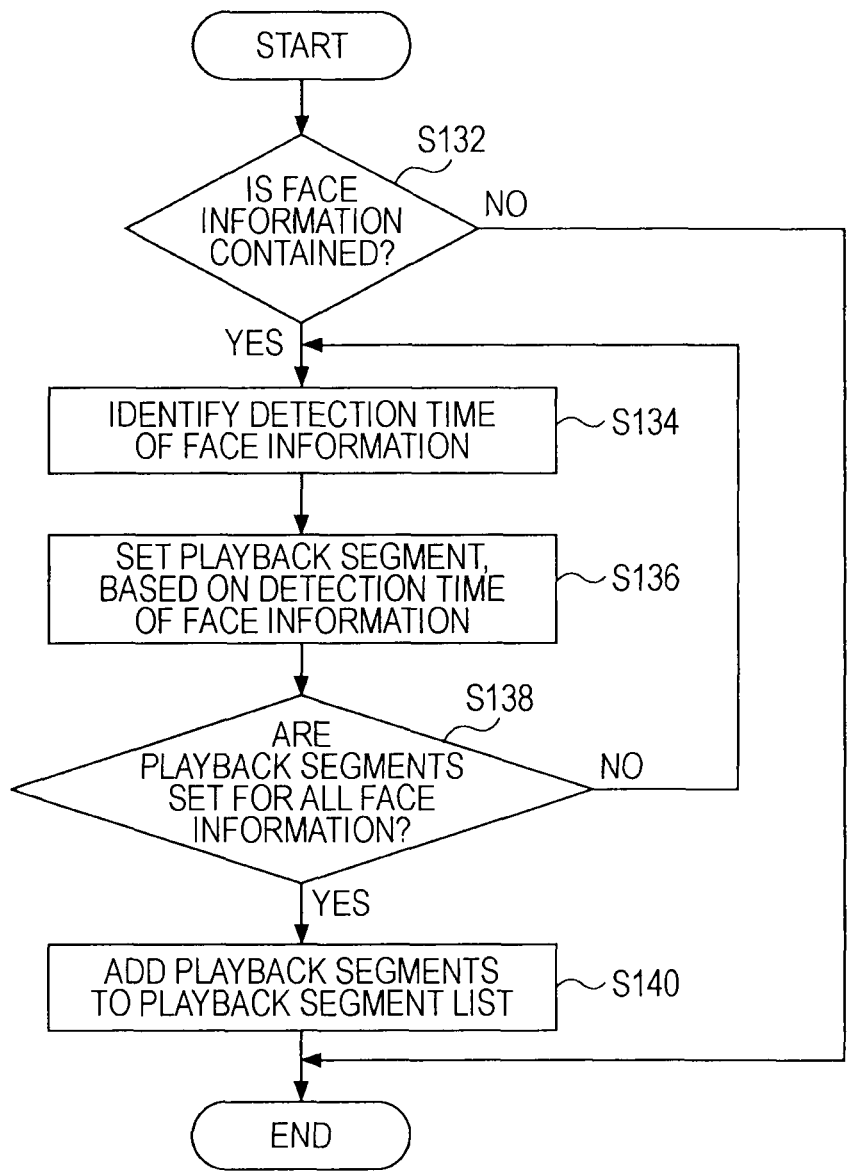
FIG. 9 is a flowchart showing details of processing for setting playback segments on the basis of face information according to the present embodiment.

Referring back to FIG. 6, after the resolution selection processing is executed in step S102, the playback-segment setting processing is executed in step S104. The playback-segment setting processing will now be described in detail with reference to FIG. 8. As shown in FIG. 8, in step S120, clip information is obtained. Next, in step S122, resolution information contained in the clip information obtained in step S120 is obtained. In step S124, a determination is made as to whether or not the resolution obtained in step S122 matches the resolution pre-determined in step S118. When it is determined in step S124 that the resolution does not match the predetermined resolution, processing in step S130 described below is performed.

When it is determined in step S124 that the resolution matches the predetermined resolution, the process proceeds to step S126 in which playback segments are set based on face information. The processing in which playback segments are set based on face information will now be described in detail with reference to FIG. 9. In step S132, a determination is made as to whether or not face information is contained in the clip information obtained in step S120. When it is determined in step S132 that face information is not contained, the processing ends.

When it is determined in step S132 that face information is contained, detection time of the face information is identified in step S134. In step S136, a playback segment is set based on the face-information detection time identified in step S134. In step S136, for example, a playback segment is set with the IN time being 2 seconds before the detection time of the face information and the OUT time being 10 seconds after the IN time. When the OUT point is not within the total playback time of the AV stream in step S136, the playback time does not necessarily have to be set.

In step S138, a determination is made as to whether or not playback segments are set for all face information. When it is determined in step S138 that playback segments are set for all face information, the process proceeds to step S140 in which the playback segments set in step S126 are added to a playback-segment list. When it is determined in step S138 that playback segments are not set for all face information, the processing in steps S134 to S138 is repeated.

Figure 10:
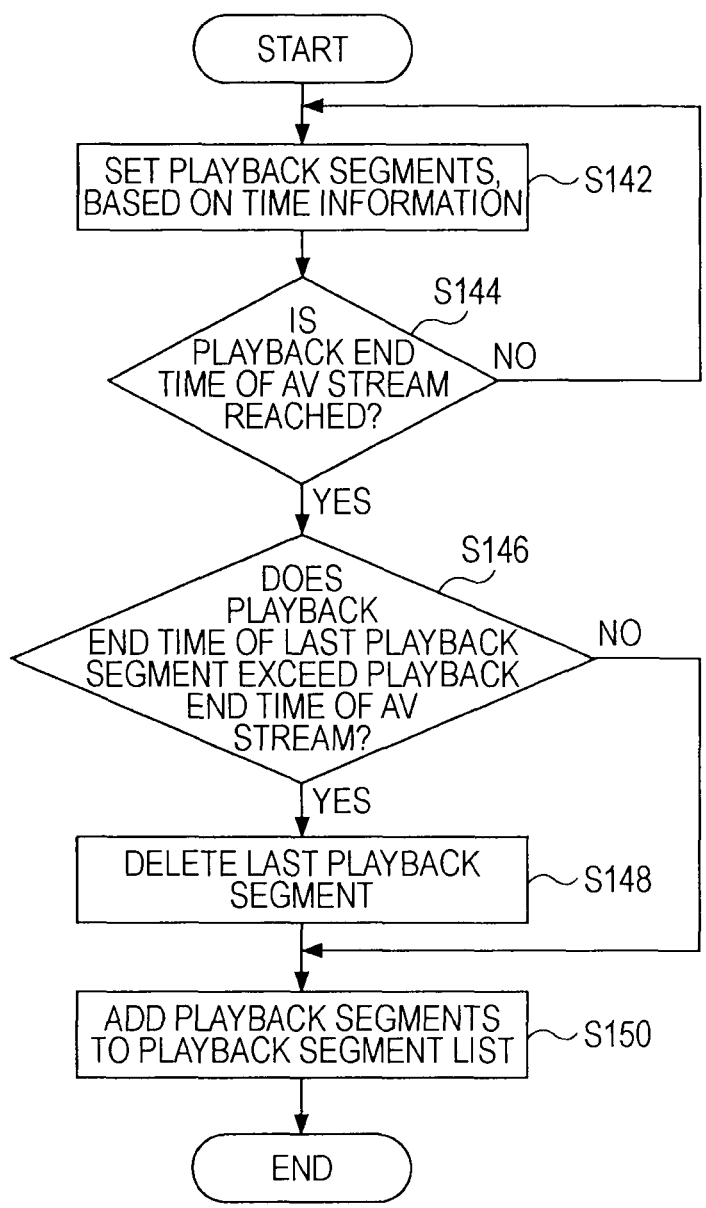
FIG. 10 is a flowchart showing details of processing for setting playback segments on the basis of time information according to the present embodiment.

Referring back to FIG. 8, after the playback segments are set based on the face information in step S126, playback segments are set based on time information in step S128. Processing in which playback segments are set based on time information will now be described in detail with reference to FIG. 10. As shown in FIG. 10, in step S142, playback segments are set based on time information. In step S142, for example, a playback segment is set with the IN point being 10 seconds after a chapter start position or 3 minutes after the previous IN-point set position and the OUT point being 10 seconds after the IN point.

Next, in step S144, a determination is made as to whether or not the playback end time of the AV stream is reached. When it is determined in step S144 that the playback end time of the AV stream is not reached, the processing in steps S142 and S144 is repeated. When it is determined in step S144 that the playback end time of the AV stream is reached, the process proceeds to step S146 in which a determination is made as to whether or not the playback end time (OUT point) of the last playback segment, i.e., the playback segment most recently set in step S142, exceeds the playback end time of the AV stream. When it is determined in step S146 that the OUT point does not exceed the playback end time, processing in step S150 is performed.

When it is determined in step S146 that the OUT point exceeds the playback end time, the process proceeds to step S148 in which the last playback segment, which was most recently set in step S142, is deleted. In step S150, the playback segments set in step S142 (which playback segments do not include the last playback segment when it was deleted in step S148) are added to the playback-segment list. Steps S144 to S148 described above may be executed in the processing in step S126 in which the playback segments are set based on the face information.

Referring back to FIG. 8, in step S130, a determination is made as to whether or not all clip information is obtained. When it is determined in step S130 that all clip information is not obtained, the processing in steps S120 to S130 is repeated. When it is determined in step S130 that all clip information is obtained, the processing ends.

Figure 11:
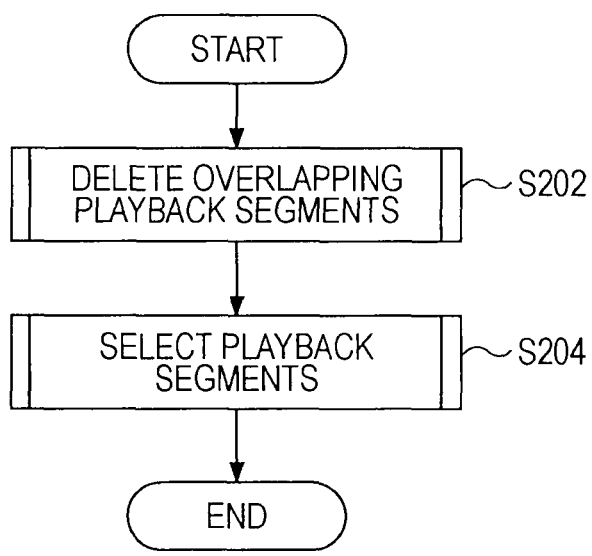
FIG. 11 is a flowchart showing processing for generating playback-segment data according to the present embodiment.
Figure 12:
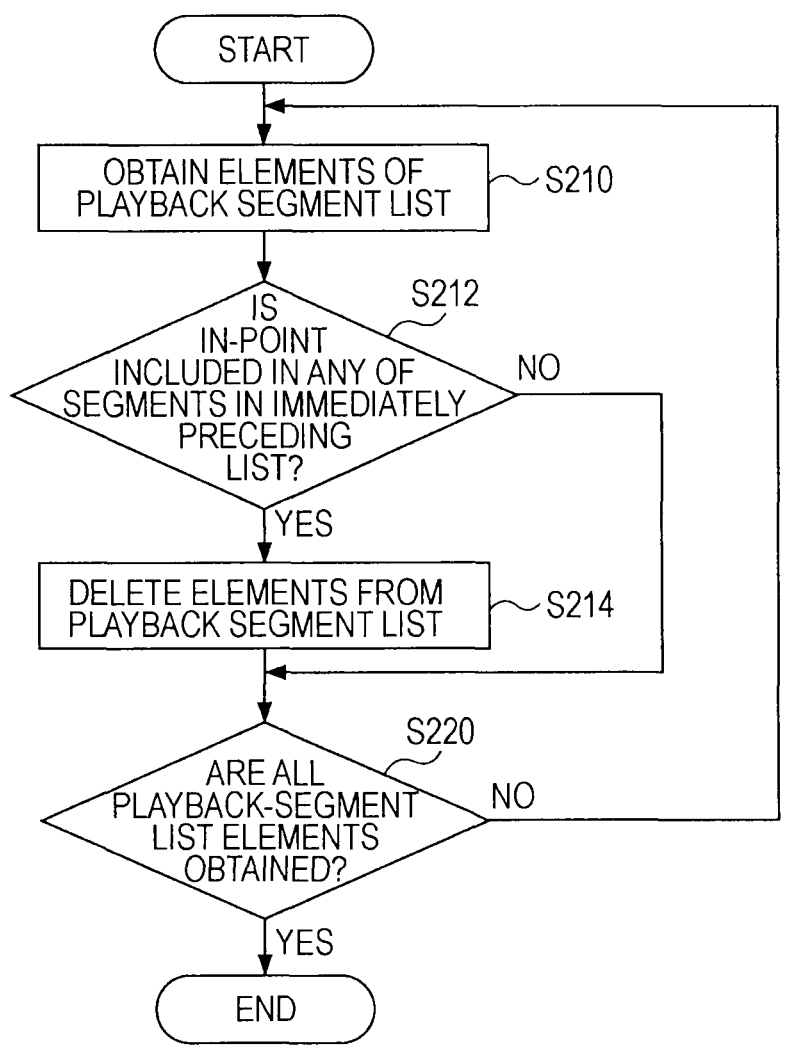
FIG. 12 is a flowchart showing details of processing for deleting overlapping playback segments according to the present embodiment.
Figure 13:
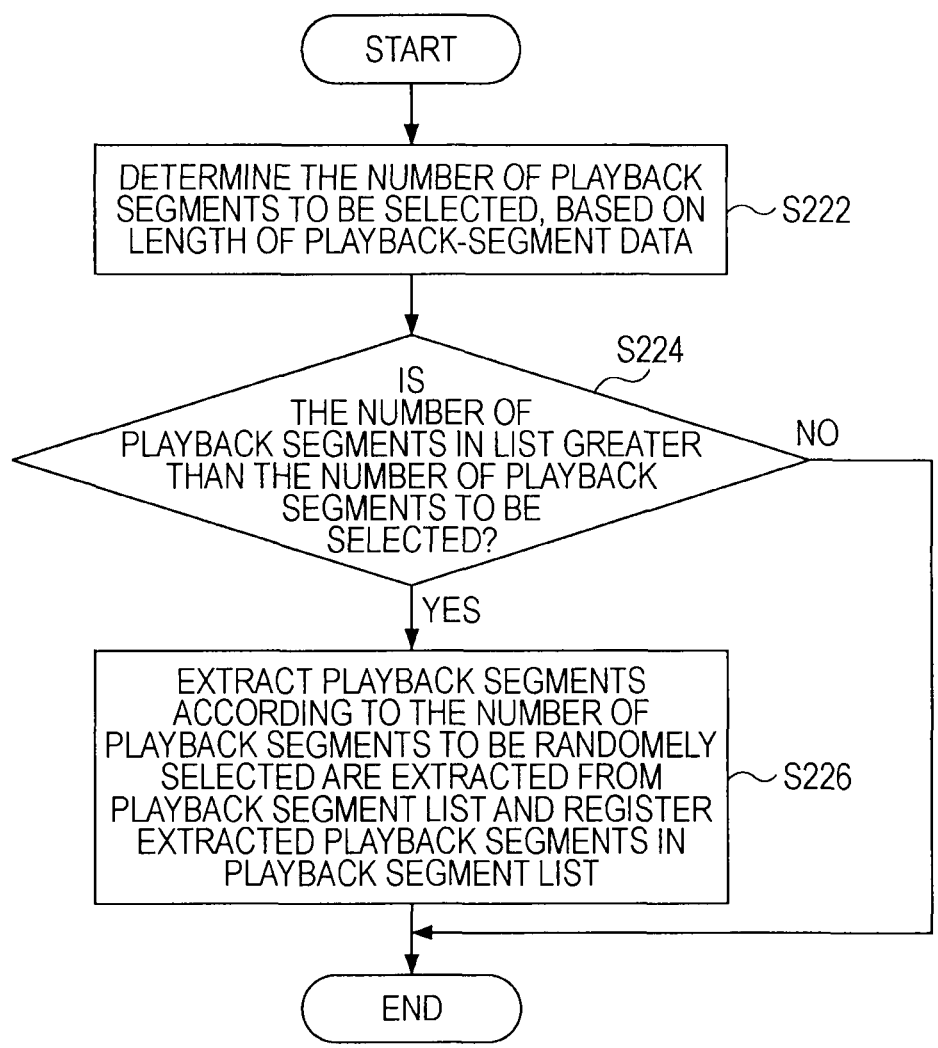
FIG. 13 is a flowchart showing details of processing for playback-segment selection according to the present embodiment.

The processing for generating the playback-segment data will now be described with reference to FIGS. 11 to 13. As shown in FIG. 11, in step S202, processing for deleting overlapping playback segments is executed. The processing for deleting overlapping playback segments will now be described in detail with reference to FIG. 12. As shown in FIG. 12, in step S210, elements of a playback-segment list are obtained first. The playback-segment list elements obtained in step S120 refer to setting information, such as the IN point and the OUT point, of a playback segment. In step S212, a determination is made as to whether or not the IN point of a playback segment is included in any of segments in an immediately preceding list. The IN point being included in any of segments in an immediately preceding list means that the IN point is included in a segment defined by the IN point and the OUT point of an immediately preceding segment.

When it is determined in step S212 that the IN point is included in any of segments in the immediately preceding list, the process proceeds to step S214 in which the playback-segment list elements obtained in step S210 are deleted from the playback-segment list. In step S220, a determination is made as to whether or not all playback-segment list elements are obtained. When it is determined that all playback-segment list elements are obtained, the processing ends. When it is determined in step S220 that all playback-segment list elements are not obtained, the processing in steps S210 to S220 is repeated.

Referring back to FIG. 11, after the overlapping-playback-segment deletion processing is executed in step S202, processing for selecting playback segments is executed in step S204. The processing for selecting playback segments will now be described in detail with reference to FIG. 13. As shown in FIG. 13, in step S222, the number of playback segments to be selected is determined based on the length of the playback-segment data. In step S224, a determination is made as to whether or not the number of playback segments added to the playback-segment list is greater than the number of playback segments determined in step S222. When it is determined in step S224 that the number of playback segments in the playback-segment list is greater than the number of playback segments determined in step S222, the process proceeds to step S226. In step S226, playback segments according to the number of playback segments to be randomly selected are extracted from the playback-segment list and the extracted playback segments are registered in the playback-segment list. Although the playback segments are randomly selected in step S226, the present invention is not limited to this example and the playback segments may be sequentially selected. When it is determined in step S224 that the number of playback segments in the playback-segment list is smaller than or equal to the number of playback segments determined in step S222, the processing ends.

Figure 14:
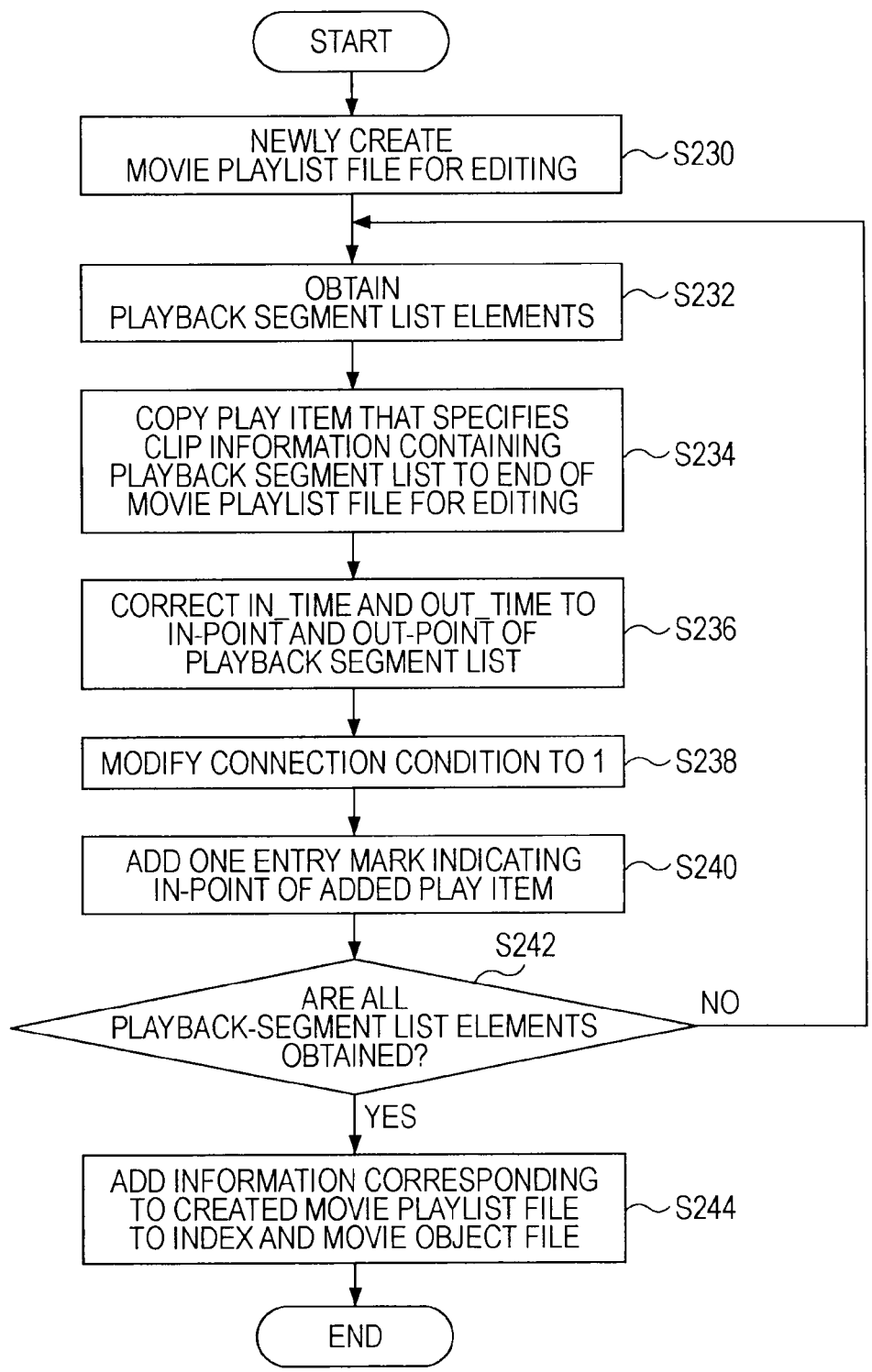
FIG. 14 is a flowchart showing one example of a method for creating a playlist in the AVCHD format according to the present embodiment.

Next, an example of a method for creating a playlist in the AVCHD format will be described with reference to FIG. 14. As shown in FIG. 14, in step S230, a movie playlist file for editing is newly created. In step S232, playback-segment list elements added to the playback-segment list are obtained. In step S234, a play item that specifies clip information containing the playback-segment list is copied to the end of the movie playlist file for editing.

In step S236, IN_time and OUT_time (the start point and the end point of a clip indicated by a play item) are corrected to the IN-point time and the OUT-point time of the playback-segment list. In step S238, a connection condition is corrected to "1". The connection condition set to "1" in step S238 is one example of the above-described discontinuity flag. In step S240, one entry mark indicating the IN point of the added play item is added.

In step S242, a determination is made as to whether or not all playback-segment list elements are obtained. When it is determined that all playback-segment list elements are not obtained, the processing in steps S232 to S240 is repeated. When it is determined in step S242 that all playback-segment list elements are obtained, the process proceeds to step S244. In step S244, information corresponding to the created movie playlist file is added to an index and a movie object file. The above-description has been given of the playlist creation method according to the present embodiment.

The information processing apparatus 100 according to the present embodiment detects feature information of an AV stream, and sets a playback segment or playback segments by setting a playback start point and a playback end point with respect to the AV stream, on the basis of the detection time point of the feature information. The information processing apparatus 100 extracts a predetermined number of playback segments from the set playback segments and generates playback-segment data containing the extracted playback segments.

This arrangement allows the user to automatically create a playlist (as a digest) including images he or she is interested in from content of captured or recorded moving images, by simply pressing an input button, such as a digest creation button, for generating the playback-segment data. That is, the user can promptly check characteristics of the content of captured or recorded moving images without checking all content of the moving images. In addition, creating a playlist according to a predetermined data-recording format allows a playback apparatus that complies with the standard of the data-recording format to check the same result.

While the preferred embodiment of the present invention has been described above with reference to the accompanying drawings, the present invention is not limited to the particular embodiment. It is apparent to those skilled in the art that various changes and modifications can be made without departing from the spirit and scope of the present invention and it should be appreciated that such changes and modifications are also encompassed by the technical scope of the present invention.

For example, although a case in which the playback-segment data is generated by specifying playback segments with respect to an AV stream and nondestructive playback edit, in which only an arbitrary portion is played back without directly modifying an AV stream file, has been described in the above embodiment, the present invention is not limited to the example. For example, the playback-segment data can also be generated for destructive edit, not for nondestructive edit. That is, actual moving images of an AV stream may be directly edited to generate playback-segment data (like a digest). In this case, the original moving-image content is lost, and thus, no repeated editing is possible. However, performing destructive editing to delete a playback segment containing no feature information makes it possible to significantly recover an available space of a storage medium.

The present application contains subject matter related to that disclosed in Japanese Priority Patent Application JP filed in the Japan Patent Office on May 7, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a detecting circuit that
      detects feature information of a plurality of audio/video streams and counts a number of faces in each of the audio/video streams,
      detects a resolution of each of the audio/video streams, and
      sets a playlist resolution to be a resolution of the audio/video stream having a highest number of faces;
   a recording circuit that records the audio/video streams, clip information defining attributes including the detected feature information, and playback-segment data specifying at least one playback segment to a storage medium in accordance with a predetermined data-recording format, the playback-segment data obtained by setting a playback start point and a playback end point with respect to the audio/video streams;
   a playback-segment setting circuit that sets the playback segments with respect to the audio/video streams based on a detection time point of the feature information, the playback-segment data generating circuit only selecting playback segments having the playlist resolution; and
   a data generating circuit that generates a playlist including only the playback segments having the playlist resolution set by the playback-segment setting circuit.

2. The information processing apparatus according to claim 1, wherein the predetermined data-recording format is an advanced video codec high definition format.

3. The information processing apparatus according to claim 1, further comprising:
   a playback-segment extracting circuit that extracts a predetermined number of playback segments from the playback segments set by the playback-segment setting circuit, in accordance with playback time of each audio/video stream, wherein
   the data generating circuit generates the playback-segment data specifying the playback segments extracted by the playback-segment extracting circuit.

4. The information processing apparatus according to claim 1, wherein the playback-segment setting circuit sets the detection time point of the feature information to the playback start time of each playback segment and sets a point at which a predetermined time passes from the detection time point of the feature information to the playback end point of the playback segment.

5. The information processing apparatus according to claim 1, wherein the playback-segment setting circuit does not set the playback segments when an amount of time from the detection time point of the feature information to a playback-end time point of the audio/video stream is smaller than a predetermined time.

6. The information processing apparatus according to claim 1, wherein the feature information detected by the detecting circuit comprises face information from the audio/video streams.

7. The information processing apparatus according to claim 1, wherein the feature information detected by the detecting circuit is time information for the audio/video streams.

8. The information processing apparatus according to claim 1, wherein the data generating circuit generates the playback-segment data by specifying the playback segments set for the audio/video streams having the playlist resolution set by the playback-segment data generating circuit.

9. The information processing apparatus according to claim 1, wherein, when the playback segments overlap each other, the data generating circuit deletes one of the overlapping playback segments.

10. The information processing apparatus according to claim 1, further comprising a discontinuity-flag setting circuit that sets a discontinuity flag for a first playback segment of the playback segments when the first playback segment and a second playback segment of the playback segments are discontinuous, the playback start point of the second playback segment being subsequent to the playback end point of the first playback segment.

11. The information processing apparatus according to claim 1, further comprising an automatic-edit-flag setting circuit that sets an automatic edit flag for the playback-segment data generated by the data generating section.

12. The information processing apparatus according to claim 1, further comprising a selecting circuit that selects a predetermined one of the audio/video streams in accordance with a user input, and the playback-segment setting circuit sets the playback segment with respect to the audio/video stream selected by the selecting circuit.

13. The information processing apparatus according to claim 1, wherein the playback-segment setting circuit sets a playback start point and a playback end point for the playback-segment data generated by the data generating circuit.

14. The information processing apparatus according to claim 1, wherein the data generating circuit generates the playback-segment data by changing the playback segments to be specified, each time the playback-segment data is generated.

15. An information processing method comprising:
   detecting feature information of a plurality of audio/video streams;
   counting a number of faces in each of the audio/video streams;
   detecting a resolution of each of the audio/video streams;

setting a playlist resolution to be a resolution of the audio/video stream having a highest number of faces;

setting at least one playback segment by setting a playback start point and a playback end point with respect to the audio/video streams based on a detection time point of the feature information, the setting including selecting only playback segments having the playlist resolution;

generating a playlist including only the playback segments having the playlist resolution; and recording the audio/video streams, clip information defining attributes including the detected feature information, and the playback-segment data to a storage medium in accordance with a predetermined data-recording format.

16. The information processing method according to claim 15, wherein the predetermined data-recording format is an advanced video codec high definition format.

17. The information processing method according to claim 15, further comprising:

extracting a predetermined number of playback segments from the playback segments in accordance with playback time of each audio/video stream, wherein the generated playback-segment data specifies the playback segments extracted in the extracting.

18. The information processing method according to claim 15, wherein the detection time point of the feature information is set to the playback start time of each playback segment and a point at which a predetermined time passes from the detection time point of the feature information is set to the playback end point of the playback segment.

19. The information processing method according to claim 15, wherein the playback segments are not set when an amount of time from the detection time point of the feature information to a playback-end time point of the audio/video stream is smaller than a predetermined time.

20. The information processing method according to claim 15, wherein the detected feature information comprises face information from the audio/video streams.

21. A non-transitory computer readable medium encoded with a program that, when executed by a computer, cause the computer to:

detect feature information of a plurality of audio/video streams;

count a number of faces in each of the audio/video streams;

detect a resolution of each of the audio/video streams;

set a playlist resolution to be a resolution of the audio/video stream having a highest number of faces;

record the audio/video streams, clip information defining attributes including the detected feature information, and playback-segment data specifying at least one playback segment to a storage medium in accordance with a predetermined data-recording format, the playback-segment data obtained by setting a playback start point and a playback end point with respect to the audio/video streams;

set the playback segments with respect to the audio/video streams based on a detection time point of the feature information and only selecting playback segments having the playlist resolution; and generate a playlist including only the playback segments having the playlist resolution.

\* \* \* \* \*